United States Patent
Nakazawa et al.

(10) Patent No.: US 11,078,550 B2
(45) Date of Patent: Aug. 3, 2021

(54) METHOD FOR MANUFACTURING QUENCHED MOLDING, METHOD FOR MANUFACTURING HOT PRESS STEEL MATERIAL, AND HOT PRESS STEEL MATERIAL

(71) Applicant: NIPPON STEEL CORPORATION, Tokyo (JP)

(72) Inventors: Yoshiaki Nakazawa, Tokyo (JP); Shinichiro Tabata, Tokyo (JP); Kazuo Hikida, Tokyo (JP); Toshiya Suzuki, Tokyo (JP); Atsuo Koga, Tokyo (JP); Koichi Hamada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/463,777

(22) PCT Filed: Nov. 22, 2017

(86) PCT No.: PCT/JP2017/042074
§ 371 (c)(1),
(2) Date: May 23, 2019

(87) PCT Pub. No.: WO2018/097200
PCT Pub. Date: May 31, 2018

(65) Prior Publication Data
US 2019/0338381 A1 Nov. 7, 2019

(30) Foreign Application Priority Data
Nov. 25, 2016 (JP) .............................. JP2016-229472

(51) Int. Cl.
*C21D 1/18* (2006.01)
*C21D 9/48* (2006.01)
(Continued)

(52) U.S. Cl.
CPC ................. *C21D 1/18* (2013.01); *C21D 9/48* (2013.01); *C22C 38/001* (2013.01);
(Continued)

(58) Field of Classification Search
CPC ........................................................ C21D 1/18
See application file for complete search history.

(56) References Cited

U.S. PATENT DOCUMENTS

| 8,414,715 B2 * | 4/2013 | Altschuler | C21D 1/25 148/590 |
| 2009/0211669 A1 * | 8/2009 | Vehof | C21D 1/673 148/654 |

(Continued)

FOREIGN PATENT DOCUMENTS

| CN | 102676930 A | 9/2012 |
| EP | 2546375 A1 | 1/2013 |

(Continued)

OTHER PUBLICATIONS

B. Pawlowski, Critical points of hypoeutectoid steel—prediction of the pearlite dissolution finish temperature Ac1f, Journal of Achievements in Materials and Manufacturing Engineering 49/2 (2011) 331-337. (Year: 2011).*

(Continued)

*Primary Examiner* — Jophy S. Koshy
(74) *Attorney, Agent, or Firm* — Birch, Stewart, Kolasch & Birch, LLP

(57) ABSTRACT

A method for manufacturing a quenched molding according to the present disclosure is a method including a first heat treatment process of heating a blanked steel material to a temperature higher than its Ac3 transformation point to perform austenite transformation, and then cooling to induce martensite transformation or bainite transformation, and a second heat treatment process of heating the steel material (Continued)

that has undergone the first heat treatment process to a temperature higher than the Ac3 transformation point to perform austenite transformation, and then cooling to induce martensite transformation. After the steel material has been heated to a temperature higher than the Ac3 transformation point in at least one process from out of the first heat treatment process or the second heat treatment process, molding is completed at a temperature higher than an Ar3 transformation point.

6 Claims, 9 Drawing Sheets

(51) Int. Cl.
　　*C22C 38/00* 　　(2006.01)
　　*C22C 38/02* 　　(2006.01)
　　*C22C 38/04* 　　(2006.01)
　　*C22C 38/26* 　　(2006.01)
　　*C22C 38/28* 　　(2006.01)
　　*C22C 38/32* 　　(2006.01)

(52) U.S. Cl.
　　CPC ............ *C22C 38/002* (2013.01); *C22C 38/02* (2013.01); *C22C 38/04* (2013.01); *C22C 38/26* (2013.01); *C22C 38/28* (2013.01); *C22C 38/32* (2013.01); *C21D 2211/002* (2013.01); *C21D 2211/008* (2013.01)

(56) References Cited

U.S. PATENT DOCUMENTS

| | | | |
|---|---|---|---|
| 2011/0005643 A1* | 1/2011 | Murakami | C21D 1/25 148/331 |
| 2012/0211132 A1 | 8/2012 | Altschuler et al. | |
| 2015/0027602 A1 | 1/2015 | Murakami et al. | |
| 2015/0090377 A1 | 4/2015 | Murakami et al. | |
| 2016/0177414 A1* | 6/2016 | Takashima | C22C 38/12 148/652 |
| 2016/0319389 A1 | 11/2016 | Hayashi et al. | |
| 2017/0029914 A1 | 2/2017 | Hayashi | |
| 2019/0093191 A1 | 3/2019 | Nakagawa et al. | |

FOREIGN PATENT DOCUMENTS

| | | | |
|---|---|---|---|
| EP | 2627790 B1 | 10/2014 | |
| EP | 2826879 A1 | 1/2015 | |
| EP | 3 231 885 A1 | 10/2017 | |
| JP | 2006-70346 A | 3/2006 | |
| JP | 2013-147749 A | 8/2013 | |
| JP | 2013-185244 A | 9/2013 | |
| JP | 2014-19941 A | 2/2014 | |
| JP | 2015-24414 A | 2/2015 | |
| JP | 2017-78188 A | 4/2017 | |
| WO | WO 2007/129676 A1 | 11/2007 | |
| WO | WO 2013/133165 A1 | 9/2013 | |
| WO | WO 2013/133166 A1 | 9/2013 | |
| WO | WO-2015019558 A1 * | 2/2015 | ............ C21D 6/004 |
| WO | WO 2015/080242 A1 | 6/2015 | |
| WO | WO 2015/102051 A1 | 7/2015 | |
| WO | WO 2016/093316 A1 | 6/2016 | |

OTHER PUBLICATIONS

International Preliminary Report on Patentability and English translation of Written Opinion of the International Searching Authority dated May 28, 2019 for PCT/JP2017/042074 (Forms PCT/IB/373 and PCT/ISA/237).
International Search Report for PCT/JP2017/042074 (PCT/ISA/210) dated Feb. 20, 2018.
Written Opinion of the International Searching Authority for PCT/JP2017/042074 (PCT/ISA/237) dated Feb. 20, 2018.
Chinese Office Action for corresponding Chinese Application No. 201780071854.0, dated Sep. 6, 2019, with partial English translation.
Extended European Search Report for corresponding European Application No. 17873745.8, dated Oct. 29, 2019.

* cited by examiner

METHOD FOR MANUFACTURING QUENCHED MOLDING, METHOD FOR MANUFACTURING HOT PRESS STEEL MATERIAL, AND HOT PRESS STEEL MATERIAL

TECHNICAL FIELD

The present disclosure relates to a method for manufacturing quenched molding, a method for manufacturing hot press steel material, and a hot press steel material.

BACKGROUND ART

There is demand for higher strength and lighter weight vehicle body configuration components used to form a vehicle body. Known methods to increase the strength of vehicle body configuration components include hot stamping, in which materials therefor are heated to 950° C., for example, and then quenched by cooling at the same time as being pressed (also referred to as hot pressing and press quenching).

SUMMARY OF INVENTION

Technical Problem

However, in such vehicle body configuration components, although a high tensile strength is achieved, there is a tendency for the toughness to decrease as the strength increases, such that it may not be possible to maintain the demanded strength in some cases.

An object of the present disclosure is to provide a method for manufacturing a quenched molding, a method for manufacturing a hot press steel material, and a hot press steel material, that each enable toughness to be raised while securing the strength of a quenched molding.

Solution to Problem

A method for manufacturing a quenched molding that solves the above problem includes a first heat treatment process of heating a blanked steel material to a temperature higher than its Ac3 transformation point to perform austenite transformation, and then cooling to induce martensite transformation or bainite transformation, and a second heat treatment process of heating the steel material that has undergone the first heat treatment process to a temperature higher than the Ac3 transformation point to perform austenite transformation, and then cooling to induce martensite transformation. After the steel material has been heated to a temperature higher than the Ac3 transformation point in at least one process from out of the first heat treatment process or the second heat treatment process, molding is completed at a temperature higher than an Ar3 transformation point.

Advantageous Effects of Invention

The present aspect provides a quenched molding having high toughness while securing strength.

DESCRIPTION OF EMBODIMENTS

Explanation follows regarding an exemplary embodiment, with reference to FIG. 1 to FIG. 9.

Figure 1:
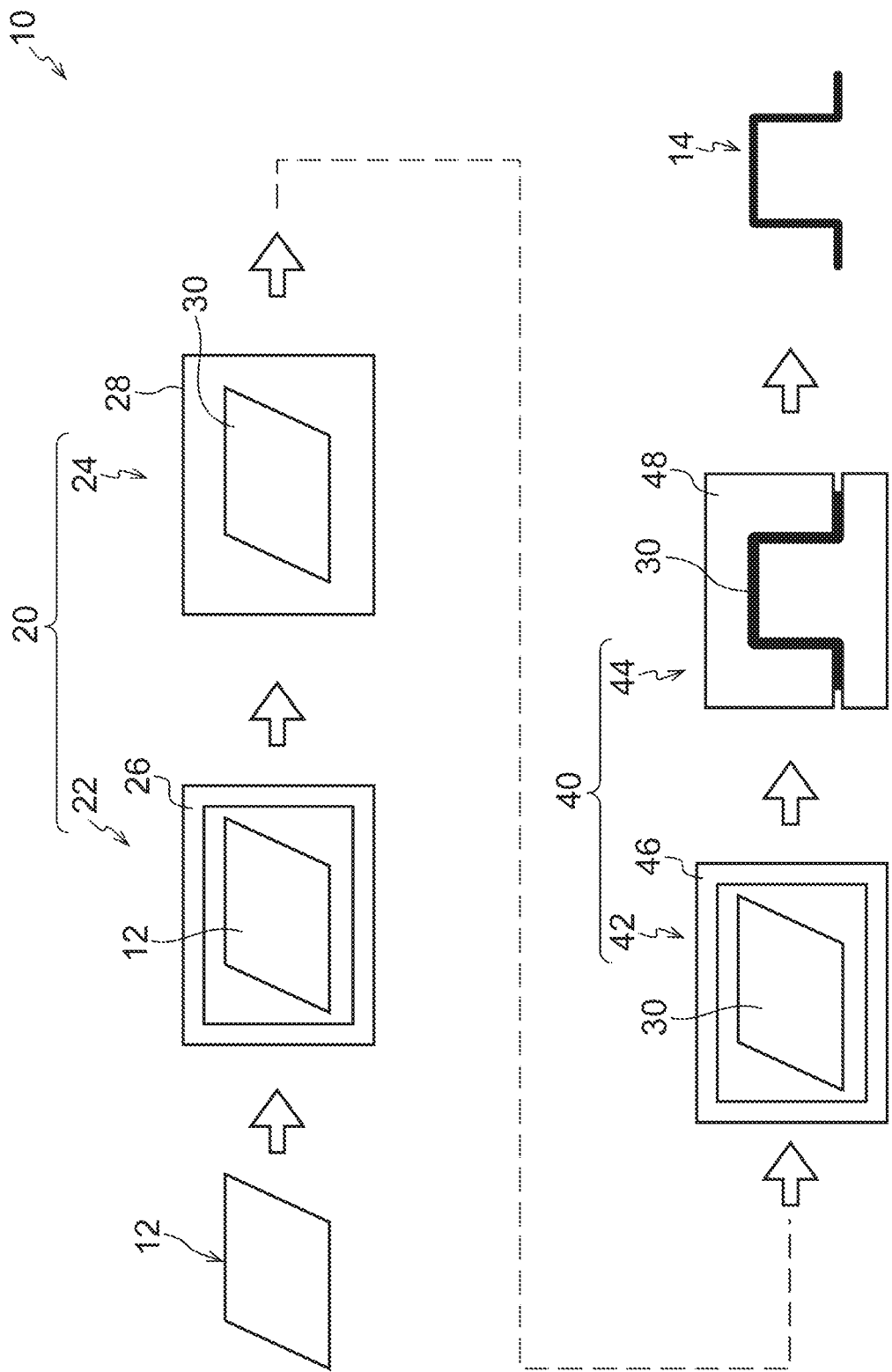
FIG. 1 is a diagram illustrating a quenched molding manufacturing method according to an exemplary embodiment.

FIG. 1 is an explanatory diagram illustrating a quenched molding manufacturing method 10 according to the present exemplary embodiment. In this diagram, a manufacturing process is illustrated in which a quenched molding 14 having a hat shaped cross-section profile is molded from a sheet steel blank 12 that is a flat sheet shaped sheet steel material.

The sheet steel blank 12 is formed by what is referred to as blanking, in which a rolled steel strip is cut to a predetermined size. The sheet steel blank 12 has a flat sheet shape.

The sheet steel blank 12 has a hard phase volume fraction of no greater than 90%. Examples of the hard phase include martensite structures and bainite structures. Specifically, the sheet steel blank 12 is primarily composed of a hard phase configured by at least one structure out of a martensite structure or a bainite structure. More specifically, a martensite structure configuring the hard phase has a volume fraction of from 50% to 90% of the sheet steel blank 12. Since the sheet steel blank 12 also includes phases other than this hard phase, the sheet steel blank 12 is easily punched from a rolled steel strip, and moreover, wear can be suppressed on a blade portion of a mold when punching is performed.

In order to facilitate cutting of the steel strip, the martensite structure is preferably set to have a volume fraction of no greater than 90% of the sheet steel blank 12. The martensite structure is more preferably set to have a volume fraction of no greater than 80% or no greater than 70% of the sheet steel blank 12.

The steel material employed as the sheet steel blank 12 preferably has a chemical composition containing, as mass %, C: from 0.3% to 0.8%, Si: from 0.001% to 2.0%, Mn: from 0.5% to 3.0%, P: no greater than 0.05%, S: no greater than 0.01%, sol. Al: from 0.001% to 1.0%, N: no greater than 0.01%, and B: no greater than 0.01%, with the remainder being made up of Fe and impurities. The chemical composition may also include one element or two or more elements selected from the group consisting of Ti, Nb, V, Cr, Mo, Cu, and Ni instead of some of the Fe.

The steel material employed as the sheet steel blank 12 preferably contains carbon at from 0.3 mass % to 0.8 mass %, and the carbon content of the sheet steel blank 12 of the present exemplary embodiment is from 0.3 mass % to 0.8 mass %.

Quenching may have little effect if the carbon C content is too low, resulting in a product that lacks strength. Accordingly, in the present exemplary embodiment, the carbon content of the sheet steel blank 12 is at least 0.3 mass %.

Conversely, the hardness may become too great if the carbon C content is too high, resulting in a product that lacks toughness. Accordingly, in the present exemplary embodiment, the carbon content of the sheet steel blank 12 is no greater than 0.8 mass %. The carbon content of the sheet steel blank 12 is thus set from 0.3 mass % to 0.8 mass %.

In order to secure a strength of 1800 MPa or greater, the C content is preferably at least 0.25 mass %. In order to obtain higher strength consistently, the C content is preferably greater than 0.30 mass %. In consideration of the toughness after quenching, the C content is more preferably no greater than 0.60 mass %, and is even more preferably no greater than 0.50 mass %.

The content of Si is preferably controlled so as to lie in a range of from 0.001 mass % to 2.0 mass %. Si is an element that has an effect of suppressing the formation of carbides in a cooling process when an austenite phase is transformed to a low temperature transformation phase, and thus either does not adversely affect ductility, or improves ductility, thereby acting to increase post-quenching strength. Such an effect is difficult to obtain if the Si content is below 0.001 mass %. The Si content is accordingly preferably at least 0.001 mass %.

Note that ductility is further improved if the Si content is at least 0.05 mass %. Accordingly, the Si content is more preferably at least 0.05 mass %. Conversely, if the Si content exceeds 2.0 mass %, as well as the effect described above becoming saturated and this being economically disadvantageous, surface texture degradation also becomes pronounced. The Si content is thus preferably no greater than 2.0 mass %. More preferably, the Si content is no greater than 1.5 mass %.

The content of Mn is preferably controlled so as to lie in a range of from 0.5 mass % to 3.0 mass %. Mn is an element that is highly effective in improving steel quenching properties and securing consistency in post-quenching strength. However, this effect cannot be adequately exploited under the rapid cooling conditions of the present exemplary embodiment at Mn contents of less than 0.5 mass %, making it very difficult to secure a tensile strength of 1200 MPa or greater as a post-quenching strength. Accordingly, the Mn content is preferably at least 0.5 mass %. Note that an Mn content of at least 1.0 mass % enables tensile strength of 1350 MPa or greater to be secured as a post-quenching strength. The Mn content is thus more preferably at least 1.0 mass %. However, if the Mn content exceeds 3.0 mass %, non-uniform structure arises in the band-shaped structure, resulting in a marked deterioration in impact characteristics. The Mn content is thus preferably no greater than 3.0 mass %. From the perspective of alloy costs and the like, the Mn content is more preferably no greater than 2.5 mass %.

The content of P is preferably controlled so as to be no greater than 0.05 mass %. P is an unavoidable impurity generally contained in steel, but may be intentionally included since it has an effect of improving strength by solid solution strengthening. However, there is significant deterioration in resistance weldability between the member of the present exemplary embodiment and other members at P contents in excess of 0.05 mass %. Moreover, the risk of brittle fracture increases if attempting to increase strength to 2500 MPa or greater. Accordingly, the P content is preferably no greater than 0.05 mass %. The P content is more preferably no greater than 0.02 mass %. In order to obtain the above effect more reliably, the P content is preferably at least 0.003 mass %.

The content of S is preferably controlled to so as to be no greater than 0.01 mass %. S is an unavoidable impurity contained in steel, and precipitates by bonding with Mn and Ti to form sulfides thereof. However, the lower the S content the better since if there is an excessive increase in the amount of precipitate then the interfaces between the precipitate and the main phase may act as the start points for fractures. Such a detrimental effect is significant at S content in excess of 0.01 mass %. Accordingly, the S content is preferably no greater than 0.01 mass %. The S content is more preferably no greater than 0.003 mass %, and is even more preferably no greater than 0.0015 mass %.

The content of sol. Al is preferably controlled so as to lie in a range of from 0.001 mass % to 1.0 mass %. Al is an element that has an effect of consolidating steel materials by removing oxygen from steel, and is also an element that has an effect of improving the yield of carbo-nitride forming elements such as Ti. The above effects are difficult to obtain if the sol. Al content is below 0.001 mass %. The sol. Al content is thus preferably at least 0.001 mass %. The sol. Al content is more preferably at least 0.015 mass %. There is a marked decrease in weldability if the sol. Al content is in excess of 1.0 mass %, and oxide inclusions increase, resulting in a marked deterioration in surface properties. The sol. Al content is thus preferably no greater than 1.0 mass %. The sol. Al content is more preferably no greater than 0.080 mass %.

The content of N is preferably controlled to so as to be no greater than 0.01 mass %. N is an unavoidable impurity contained in steel, and the content thereof is preferably as low as possible from the perspective of weldability. An N content in excess of 0.01 mass % results in a marked decrease in weldability. The N content is thus preferably no greater than 0.01 mass %. The N content is more preferably no greater than 0.006 mass %.

The content of B is preferably controlled to no greater than 0.01 mass %. B is an element that has an effect of raising low temperature toughness. B may therefore be contained. However, there is a deterioration in hot workability and hot rolling becomes difficult if B is included at a content in excess of 0.01 mass %. The B content is thus preferably no greater than 0.01 mass %. Note that in order to obtain the above effects reliably, the B content is more preferably at least 0.0003 mass %.

Other Addition Elements

Ti, Nb, V, Cr, Mo, Cu, and Ni may also be added if required in order to improve steel quenching properties and secure consistency in post-quenching strength.

First Heat Treatment Process

A first heat treatment process 20 is performed in order to mold the quenched molding 14 from the sheet steel blank 12. The first heat treatment process 20 includes a heating process 22 to heat the sheet steel blank 12, and a cooling process 24 to cool the heated sheet steel blank 12.

In the heating process 22, the sheet steel blank 12 is heated to a temperature higher than the Ac3 transformation point in a heating furnace 26 to perform austenite transformation. Examples of the heating furnace 26 include a high frequency induction furnace, a resistance furnace, a gas furnace, or an infrared furnace.

When heating the sheet steel blank 12 in the heating process 22, the heat treatment heating temperature is preferably in a range from the Ac3 transformation point of the sheet steel blank 12+50° C. to the Ac3 transformation point+150° C. In the present exemplary embodiment, the heat treatment heating temperature is set at a constant temperature in the range from the Ac3 transformation point+50° C. to the Ac3 transformation point+150° C.

Note that the temperature of the austenite transformation point (Ac3) varies according to the state of carbide dissolution, namely the chemical composition after dissolution. In other words, the austenite transformation point varies according to the amount of carbide dissolution.

Undissolved carbides are retained when materials having a high carbide content (materials with a high C content) are heated for a short time, necessitating the heat treatment heating temperature to be set high. Accordingly, in the sheet steel blank 12 of the present exemplary embodiment, in which the carbon content is set in a range from 0.3 mass % to 0.8 mass %, the heat treatment heating temperature is preferably set to no lower than the Ac3 transformation point+50° C.

However, the austenite grain size increases if the heat treatment heating temperature is too high. A martensite structure transformed from austenite with a large grain size has lower toughness. The heat treatment heating temperature is therefore preferably no higher than the Ac3 transformation point+150° C.

If the in-furnace time of the sheet steel blank 12 during heating is too long at this stage then the crystal grains might become larger grains, which would affect toughness. The heating time of the sheet steel blank 12 at high temperature from when the sheet steel blank 12 reaches the target heat treatment heating temperature is therefore preferably set to 20 minutes or shorter, and is more preferably set to 400 seconds or shorter.

In the heating process 22 of the present exemplary embodiment, the in-furnace time of the sheet steel blank 12 from when it reaches the target heat treatment heating temperature until when it is removed from the heating furnace (i.e. the soaking time from reaching the target heat treatment heating temperature) is 400 seconds or shorter.

In the cooling process 24, the sheet steel blank 12 that has been heated to achieve an austenite structure in the heating process 22 is then cooled by a cooling device 28 so as to induce martensite transformation or bainite transformation. Namely, the rate of cooling when cooling with the cooling device 28 is rapid cooling of the sheet steel blank 12 at the critical cooling rate for martensite transformation or bainite transformation or faster. The cooling rate here is determined according to the composition of the sheet steel blank 12. Examples of the cooling device 28 include a cold air type of cooling device, an accelerated cooling device using water, or a gas type of cooling device.

A hot press steel material 30 suited to hot pressing in a subsequent process can be formed by the first heat treatment process 20. In such cases, the hot press steel material 30 having a carbon content of from 0.3 mass % to 0.8 mass % is obtained by performing the processes 22, 24 described above on the sheet steel blank 12 described above.

Moreover, subjecting the sheet steel blank 12 described above to the processes 22, 24 described above obtains the hot press steel material 30 in which a sum of volume fractions of martensite structure and bainite structure is substantially 100%. However, it has been confirmed that as long as the sum of volume fractions of martensite structure and bainite structure is at least 80% then there is little residual undissolved carbide at subsequent heating processes, thereby obtaining a hot press steel material 30 with excellent toughness compared to conventional products. The hot press steel material 30 accordingly has a sum of volume fractions of martensite structure and bainite structure of at least 80%, with the remainder being ferrite, a pearlite structure configured by ferrite and cementite, or the like.

Second Heat Treatment Process

The hot press steel material 30, serving as an example of a flat blank, is then subjected to a second heat treatment process 40. The second heat treatment process 40 includes a heating process 42 to heat the hot press steel material 30 formed in the first heat treatment process 20, and a molding-quenching process 44 to mold the heated hot press steel material 30 and to cool the heated hot press steel material 30 at the same time as molding completion.

In the heating process 42 of the second heat treatment process 40, the hot press steel material 30 formed in the first heat treatment process 20 is heated at a temperature higher than its Ac3 transformation point in a heating furnace 46 to perform austenite transformation. Examples of the heating furnace 46 include the same types of heating furnaces as for the heating furnace 26 described above. The heat treatment heating temperature for heating the hot press steel material 30 to in the heating process 42 of the second heat treatment process 40 is preferably a temperature higher than the Ac3 transformation point but no higher than the Ac3 transformation point+80° C. Accordingly, in the present exemplary embodiment, the heat treatment heating temperature is set to a constant temperature higher than the Ac3 transformation point but no higher than the Ac3 transformation point+80° C.

Due to the hot press steel material 30 formed as a result of the first heat treatment process 20 having carbon C that is finely dispersed, carbides can easily be dissolved in the second heat treatment process 40 without raising the temperature much above the Ac3 transformation point. Austenite transformation accordingly occurs readily. Moreover, in order to obtain a final product with excellent toughness, the austenite grain size is controlled (maintained) at a fine grain size. Accordingly, the heat treatment heating temperature in the second heat treatment process 40 is set to a temperature higher than the Ac3 transformation point but no higher than the Ac3 transformation point+80° C. The heat treatment temperature region in the second heat treatment process 40 is a lower temperature region than the heat treatment heating temperature in the first heat treatment process 20.

If the in-furnace time when heating the hot press steel material 30 is too long here then the crystal grains might become larger grains, which would affect toughness of the final product. The heating time of the hot press steel material 30 is accordingly preferably set so as to be 20 minutes or shorter from when the hot press steel material 30 reaches the target heat treatment heating temperature, and is more preferably set so as to be 400 seconds or shorter.

In the present exemplary embodiment, the in-furnace time in the heating process 42 from when the hot press steel material 30 has reached the target heat treatment heating temperature until it is removed from the heating furnace (the soaking time from reaching the target heat treatment heating temperature) is set to 400 seconds or shorter.

In the molding-quenching process 44 of the second heat treatment process 40, the hot press steel material 30 that has been heated to a temperature higher than the Ac3 transformation point in the heating process 42 is pressed and molded by a mold 48 while at a temperature higher than the Ar3 transformation point. The hot press steel material 30 is thereby molded into a hat-shaped cross-section profile.

At the same time as molding completion, the heat of the hot press steel material 30 is taken out by the mold 48 to cool the hot press steel material 30, thereby inducing martensite transformation in the hot press steel material 30 and forming the quenched molding 14. More specifically, the mold 48 is closed, and a temperature of at least the Ar3 transformation point is maintained until the point in time when a predetermined profile has been formed. Immediately thereafter, rapid cooling is performed using the mold 48 to remove heat so as to form the quenched molding 14.

Note that boundaries at temperatures where changes to or from single phase austenite occur are referred to as A3 transformation points. Strictly speaking, the temperature at which a change to single phase austenite occurs as temperature rises is Ac3. The temperature at which single phase austenite ceases to exist as the single phase austenite steel material is cooled is Ar3. A temperature higher than the Ar3 transformation point is accordingly employed when molding by pressing with the mold 48.

The quenched molding 14 obtained by the second heat treatment process 40 is principally constituted by a martensite structure, having a volume fraction of martensite structure of at least 50%. In order to achieve higher strength quenched moldings 14, the volume fraction of martensite structure is at least 70%, is preferably at least 80%, and the volume fraction of martensite structure is more preferably at least 90%.

Examples of the quenched molding 14 include a structural member for an automobile, such as bumper reinforcement, a center pillar, an A pillar, a roof rail, a side sill, or a frame designed to suppress deformation such that only minor deformation occurs in a collision. The quenched molding 14 enables the strength (collision-withstand performance) in an automobile collision to be raised since brittle fracture does not occur in a collision. This enables a vehicle body that is strong yet lightweight to be achieved by reducing wall thicknesses.

The method used to measure the volume fractions of the respective structures is as follows.

A sample having a cross-sectional face sectioned along the rolling direction and the thickness direction (referred to hereafter as an "L cross-section") is taken from a product to be measured.

Next, the L cross-section of the sample is polished and etched with nital to erode and develop the grain boundaries in the L cross-section.

Next, a region (200 μm×200 μm) of the L cross-section of the sample at a position at ¼ of the thickness T from the sample surface is observed at 500× magnification using a scanning electron microscope with an electron backscatter diffraction device (EBSD device). The surface area ratio of each structure with respect to the observation window are each found in the observation window. The surface area ratio of each structure is determined to be the volume fraction of each structure.

Note that identification of the respective structures in the observation window is performed in the following manner.

For ferrite structures, bainite structures, and martensite structures, measurement points having BCC crystal structures are displayed using OIM Analysis version 7.2.1, this being EBSD measurement analysis software, and these structures are identified based on crystal orientation distribution and Image Quality Map values. For austenite structures (including retained austenite structures), measurement points having FCC crystal structures are displayed and identified using a similar method.

Operation and Advantageous Effects

Explanation follows regarding operation and advantageous effects of the quenched molding manufacturing method according to the present exemplary embodiment.

In the present exemplary embodiment, the sheet steel blank 12 is formed by blanking a steel strip, and the sheet steel blank 12 is quenched during the first heat treatment process 20.

Were it to be the steel strip that was quenched here, then the quenched steel strip would become prone to cracking when being rolled up, payed out, or the like.

More specifically, examples of take up on a pickling line include belt winding using a belt wrapper, and grip winding in which a leading end of the steel strip is gripped in a tension reel mandrel and coiled. Belt winding is not possible with a quenched steel strip due to its high yield stress. There would, moreover, be a concern of cracking at the location gripped by the mandrel were grip winding to be performed on a quenched steel strip. Furthermore, the steel strip is flattened using a leveler when it is being payed out. A quenched steel strip might crack as it passes through the leveler, or flatness defects might not be able to be corrected. Really bad flatness might mean that a transfer robot for loading a press was unable to grab the quenched steel strip.

By contrast, in the present exemplary embodiment, a steel strip blanked into the sheet steel blank 12 is quenched in the first heat treatment process 20. This thereby enables the processing of the next process to be performed without flattening the hot press steel material 30 quenched in the first heat treatment process 20 using a leveler, or coiling the hot press steel material 30, enabling unforeseen cracking to be suppressed.

Preferably the sheet steel blank 12 is subjected to plastic working using a plastic working process such as hot pressing or cold pressing prior to the first heat treatment process 20 in which quenching is performed. In such cases, the first quenching in the first heat treatment process 20 is performed by clamping in a mold conforming to the profile after plastic-working and/or by appropriate cooling with a coolant medium such as cooling water.

When an intermediate molding has a predetermined non-flat shape after the first quenching, not only does this facilitate setting of the intermediate molding in a mold for subsequent hot working so as to be positioned with respect to a punch with reference to the predetermined profile, but moreover results in the deformation load being distributed during pressing. Higher moldability is expected to result therefrom.

The plastic working process may be hot working or may be cold working. From the perspective of reducing the number of processes, the plastic working process is preferably hot working, with the first quenching performed in the hot working while the mold remains closed.

Martensite transformation or bainite transformation is induced after the sheet steel blank 12 has first been transformed into austenite and carbide has been fully dissolved into a solid solution in the heating process 22 of the first heat treatment process 20. This enables the hot press steel material 30 to be formed in the molding-quenching process 44 of the second heat treatment process 40 while in a smaller austenite grain size (hereafter "gamma grain size") state than in cases in which the sheet steel blank 12 is transformed to ferrite and pearlite. This enables improved structural toughness to be achieved.

In the first heat treatment process 20, after the sheet steel blank 12 has been heated to a temperature higher than the Ac3 transformation point and transformed into austenite, the sheet steel blank 12 is then cooled to induce martensite transformation or bainite transformation.

It is desirable at this stage to obtain a hot press steel material 30 with a high proportion of martensite structure or bainite structure in the first quenching in the first heat treatment process 20. The entire sheet steel blank 12 is accordingly preferably constituted by an austenite structure at the quenching start time when cooling is started.

Note that in the present exemplary embodiment, the sheet steel blank 12 is heated to a temperature higher than the Ac3 transformation point and transformed into austenite by setting the heating temperature by the heating furnace 26 higher than the Ac3 transformation point. The austenite structure of the sheet steel blank 12 can accordingly be maintained at the quenching start time when rapid cooling is started, even if the sheet steel blank 12 is air-cooled in the period of time from removing the sheet steel blank 12 from the heating furnace 26 until cooling is started. This thereby enables a hot press steel material 30 with a high proportion of martensite structure or bainite structure to be obtained.

Next, even in cases in which carbides in the hot press steel material 30 have not been completely eliminated prior to heating, any such carbides can be dissolved in a short period of time when the hot press steel material 30 is heated in the second heat treatment process 40, due to the fine grain size of such carbides. Retained carbides can thus be eliminated at the start of the molding-quenching process 44 of the second heat treatment process 40. Moreover, the gamma grain size can be made finer in order to achieve increased toughness by heating in the second heat treatment process 40. The quenched molding 14 is transformed to martensite as a result of the second heat treatment process 40, thereby enabling the strength to be raised of the quenched molding 14 formed thereby.

Namely, in cases in which a material having a high carbon content is employed in order to raise the strength of the final molding, there is a concern that undissolved carbides not dissolved in a solid solution might be retained even when heating has ended. If, however, the heating temperature is raised or the heating time prolonged in order to fully dissolve carbides in a solid solution then this would tend to result in a larger gamma grain size. In such cases, the martensite structure transformed from such large gamma grain size would have a lower toughness, and the final molding would be brittle due to resulting non-conformities developing between such retained carbides present therein and the main phase.

Were vehicle body configuration components to be formed from such a brittle final molding, the component might break before the potential maximum material strength of the material of the final molding had been expressed when the component was, for example, deformed in a collision. The intended design characteristics would therefore not be obtained, necessitating design modifications.

In the quenched molding manufacturing method of the present exemplary embodiment, austenite transformation heat treatment is performed at least twice, in the first heat treatment process 20 and the second heat treatment process 40, and phase transformation processing from austenite to a hard phase is performed at least twice. This enables retained carbides to be eliminated and enables martensite transformation to be induced from a fine gamma grain size, thereby enabling a quenched molding 14 with high toughness to be obtained.

Namely, the quenched molding 14 can be obtained that has high toughness while also securing the strength thereof.

The quenched molding 14 obtained by a quenched molding manufacturing method such as described above has a material strength of 1.8 GPa or greater, while also not encountering premature fracture due to brittleness even in deformation states of high multiaxial stress, such as deformations in a collision. Namely, it has been possible to confirm that both high strength and high toughness are achieved as intended.

Note that although in the present exemplary embodiment, explanation has been given regarding a case in which the hot press steel material 30 is formed by quenching in the first heat treatment process 20, and the hot press steel material 30 is pressed in the second heat treatment process 40 to form the quenched molding 14, there is no limitation thereto.

For example, after the sheet steel blank 12 has been heated to a temperature higher than the Ac3 transformation point in the first heat treatment process 20 in which quenching is performed for the first time, the sheet steel blank 12 may then be cooled while in a closed mold by a mold at a temperature higher than the Ar3 transformation point to form a pressed molding.

Note that were a flat sheet steel blank 12 simply to be cooled rapidly in the first quenching in the first heat treatment process 20, then this might result in uneven cooling and a deterioration in flatness. Moreover, if a non-flat sheet steel blank 12 was to be further cooled rapidly then this would exacerbate the uneven cooling.

To address this, after the sheet steel blank 12 has been heated to a temperature higher than the Ac3 transformation point in the first heat treatment process 20, the sheet steel blank 12 is then cooled while in a closed mold by a mold at a temperature higher than the Ar3 transformation point. This enables uneven cooling to be suppressed.

Moreover, obtaining the predetermined profile for the pressed molding in the first quenching in the first heat treatment process 20 enables greater consistency when performing the second heat treatment process 40.

Note that the cooling is preferably direct cooling by mold cooling in which the heat of the sheet steel blank 12 is removed by the mold, in which cooling is performed by removing coolant from the mold.

The pressed molding that has been molded in the first heat treatment process 20 may be merely quenched, without subjecting the pressed molding to pressing or the like in the second heat treatment process 40. Moreover, the sheet steel blank 12 may be press molded in the first heat treatment process 20, and also subjected to pressing or the like in the second heat treatment process 40.

Moreover, although explanation has been given regarding an example in which the first heat treatment process 20 including the heating process 22 and the cooling process 24 is performed a single time, there is no limitation thereto. The first heat treatment process 20 may be performed plural times. In such cases, each time the first heat treatment process 20 is performed, the heat treatment heating temperature is preferably set in a range from the Ac3 transformation point+50° C. to the Ac3 transformation point+150° C., and the final heat treatment heating temperature in the second heat treatment process 40 is preferably set to a temperature higher than the Ac3 transformation point but no higher than the Ac3 transformation point+80° C.

Moreover, although the sheet steel blank 12 is heated in a range from the Ac3 transformation point+50° C. to the Ac3 transformation point+150° C. in the heating process 22 of the first heat treatment process 20, there is no limitation thereto. It is sufficient to heat the sheet steel blank 12 to a temperature higher than the Ac3 transformation point.

Note that the Ac3 transformation point can be found from the composition of the sheet steel using Equation (1) below.

$$Ac3(° C.) = 910 - 203 \times \sqrt{C} \text{ (mass \%)} + 44.7 \times Si \text{ (mass \%)} - 30 \times Mn \text{ (mass \%)} - 11 \times Cr \text{ (mass \%)} + 700 \times S \text{ (mass \%)} + 400 \times Al \text{ (mass \%)} + 50 \times Ti \text{ (mass \%)} \quad \text{Equation (1)}$$

Wherein C represents Carbon, Si represents Silicon, Mn represents Manganese, Cr represents Chromium, S represents Sulfur, Al represents Aluminum, and Ti represents Titanium.

The Ac3 transformation point found using Equation (1) indicates a temperature when heating is performed at a slow rate of temperature increase (for example a rate of temperature increase of 3° C./second or slower). However, heating is performed on a manufacturing line at a higher rate of temperature increase in order to improve productivity.

The sheet steel blank 12 is accordingly preferably heated at a rate of temperature increase of at least 20° C./second in the heating process 22 of the first heat treatment process 20 in order to improve productivity, and, as another exemplary embodiment, a rate of temperature increase is set to at least 20° C./second in the heating process 22 of the first heat treatment process 20.

The Ac3 transformation point for such cases diverges from the temperature found using Equation (1). The amount of divergence is known from experience to result in a temperature therefor that is approximately 20° C. greater than the result of the calculation of Equation (1) when the rate of temperature increase is set to at least 20° C./second.

Accordingly, on the manufacturing line of the present exemplary embodiment, the heat treatment heating temperature when heating the sheet steel blank 12 in the heating process 22 is set to a range of from the Ac3 transformation point according to the Equation (1) above+70° C. to the Ac3 transformation point+170° C.

Moreover, although the hot press steel material 30 is heated to a temperature higher than the Ac3 transformation point but no higher than the Ac3 transformation point+80° C. in the second heat treatment process 40, there is no limitation thereto. It is sufficient for the hot press steel material 30 to be heated therein to at least the Ac3 transformation point.

As described above, the Ac3 transformation point found using the above Equation (1) indicates a temperature when heating is performed at a slow rate of temperature increase (for example a rate of temperature increase of 3° C./second or slower). However, heating is performed on a manufacturing line at a higher rate of temperature increase in order to improve productivity.

The sheet steel blank 12 is accordingly preferably heated at a rate of temperature increase of at least 20° C./second in the heating process 42 of the second heat treatment process 40, and, as another exemplary embodiment, the rate of temperature increase is set to at least 20° C./second in the heating process 42 of the second heat treatment process 40.

The Ac3 transformation point for such cases diverges from the temperature found using Equation (1). The amount of divergence is known from experience to result in a temperature therefor that is approximately 20° C. greater than the result of the calculation of Equation (1) when the rate of temperature increase is set to at least 20° C./second.

Accordingly, on the manufacturing line of the present exemplary embodiment, the heat treatment heating temperature when heating the hot press steel material 30 in the heating process 42 of the second heat treatment process 40 is set to a range of from the Ac3 transformation point defined according to the Equation (1)+20° C. to the Ac3 transformation point+100° C.

Although the sheet steel blank 12 has a carbon content of from 0.3 mass % to 0.8 mass %, there is no limitation thereto. The sheet steel blank 12 may have a carbon content of less than 0.3 mass % or a carbon content of greater than 0.8 mass %.

The first heat treatment process 20 is not necessarily performed. In such cases, the advantageous effects described above can still be obtained as long as the structure of the steel material employed in the second heat treatment process 40 is a bainite structure or a martensite structure. Superior toughness to that of conventional products is still obtained in such cases as long as the sum of the volume fractions of martensite structure and bainite structure of the steel material employed in the second heat treatment process 40 is at least 80%.

Moreover, the second heat treatment process 40 may be performed alone in cases in which a hot press steel material 30 as described above (steel material in which the sheet steel blank 12 has been transformed into austenite followed by inducing martensite transformation or bainite transformation) is supplied. In such cases the quenched molding 14 is formed by pressing during the second heat treatment process 40 if the supplied hot press steel material 30 has not already been molded.

Quenching may be performed alone without pressing or the like in the second heat treatment process 40 if the supplied hot press steel material 30 has already been molded. Moreover, pressing or the like may be performed in the second heat treatment process 40 even in cases in which the supplied hot press steel material 30 has already been molded.

EXAMPLES

Table 1 is a table listing chemical compositions of sheet steels employed in respective examples for Steel A to Steel D.

TABLE 1

| | Chemical Composition (mass %) | | | | | | | | | | | |
|---|---|---|---|---|---|---|---|---|---|---|---|---|
| Steel | C | Si | Mn | P | S | Cr | Ti | Nb | B | sol. Al | N | Ac3 |
| A | 0.45 | 1.5 | 0.4 | 0.012 | 0.0007 | 0.02 | 0.021 | 0.08 | 0.0021 | 0.038 | 0.0032 | 865° C. |
| B | 0.35 | 0.1 | 1.3 | 0.010 | 0.0010 | 0.41 | 0.025 | 0.08 | 0.0020 | 0.051 | 0.0041 | 793° C. |
| C | 0.31 | 0.2 | 1.7 | 0.011 | 0.0008 | 0.21 | 0.021 | 0.078 | 0.0019 | 0.046 | 0.0035 | 801° C. |
| D | 0.21 | 0.24 | 1.25 | 0.008 | 0.0027 | 0.20 | 0.021 | 0.003 | 0.0018 | 0.035 | 0.0036 | 825° C. |

Example 1

Figure 2:
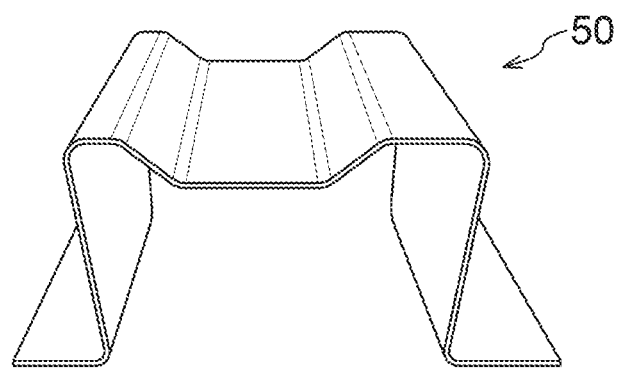
FIG. 2 is a diagram illustrating a bumper according to Example 1.
Figure 3:
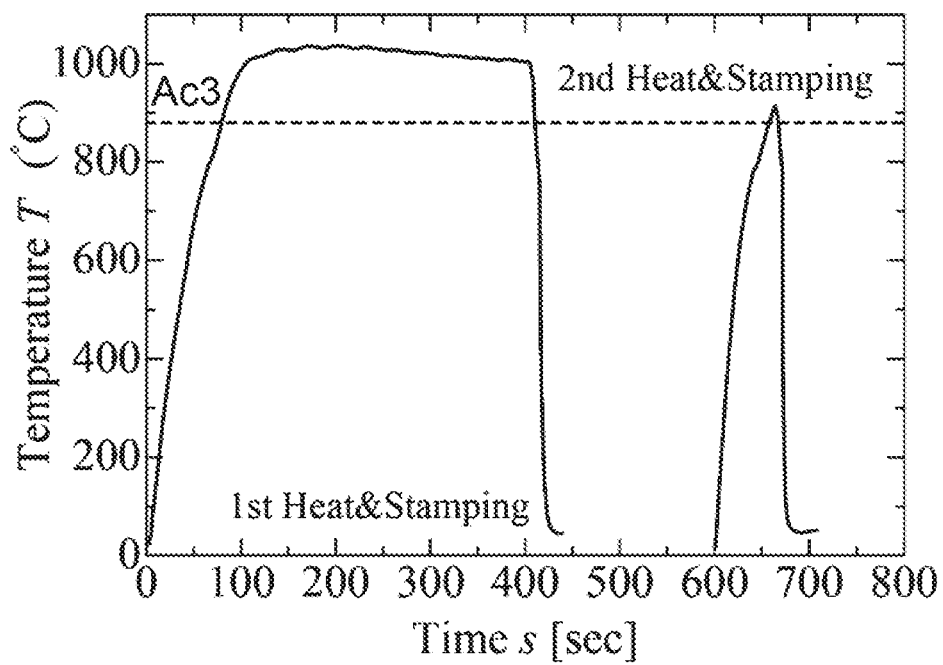
FIG. 3 is a diagram illustrating a thermal history of a bumper according to the Example 1.

Steel A material (cold rolled sheet steel) with a sheet thickness of 1.4 mm was employed to verify the advantageous effects of performing heat treatment twice using a mold in order to form a bumper cross-section profile model 50, as illustrated in FIG. 2. FIG. 3 illustrates a thermal history of the bumper cross-section profile model 50 when it is being molded.

In the first heat treatment process (corresponding to the first heat treatment process 20 of the exemplary embodiment), after the material to be molded had been heated to 1000° C. and held at a constant temperature for approximately 5 minutes so that all carbides in the material to be molded are dissolved as a solid solution, the material to be molded was then loaded into a press mold and molding performed, with the material to be molded quenched by cooling with the mold to room temperature using contact heat transfer with the mold.

Then, in the second heat treatment process (corresponding to the second heat treatment process 40 of the exemplary embodiment), the material to be molded was heated to approximately 900° C., this being just above the Ac3 transformation point. Immediately thereafter, the material to be molded was loaded into a mold and quenched by cooling with the mold while performing final press molding so as to manufacture the bumper cross-section profile model 50 (Example 1).

Note that, as a comparative example, after the same Steel A material had been heated to approximately 950° C. and held at a constant temperature for approximately 5 minutes, the Steel A material was loaded into the press mold and molding performed, with the material to be molded cooled with the mold so as to manufacture a bumper cross-section profile model 50 (Comparative Example 1).

Moreover, a Steel D material with a lower carbon C content was similarly heated to approximately 950° C. and held at a constant temperature for approximately 5 minutes, before being loaded into the press mold and molded, and then cooled by the mold so as to manufacture a bumper cross-section profile model 50 (Comparative Example 2).

Figure 4:
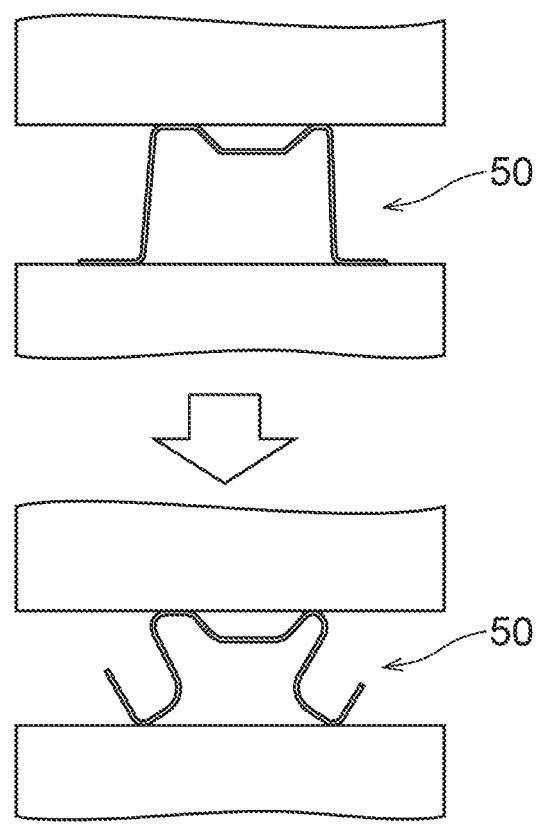
FIG. 4 is an explanatory diagram illustrating deformation testing of a bumper according to Example 1.
Figure 5:
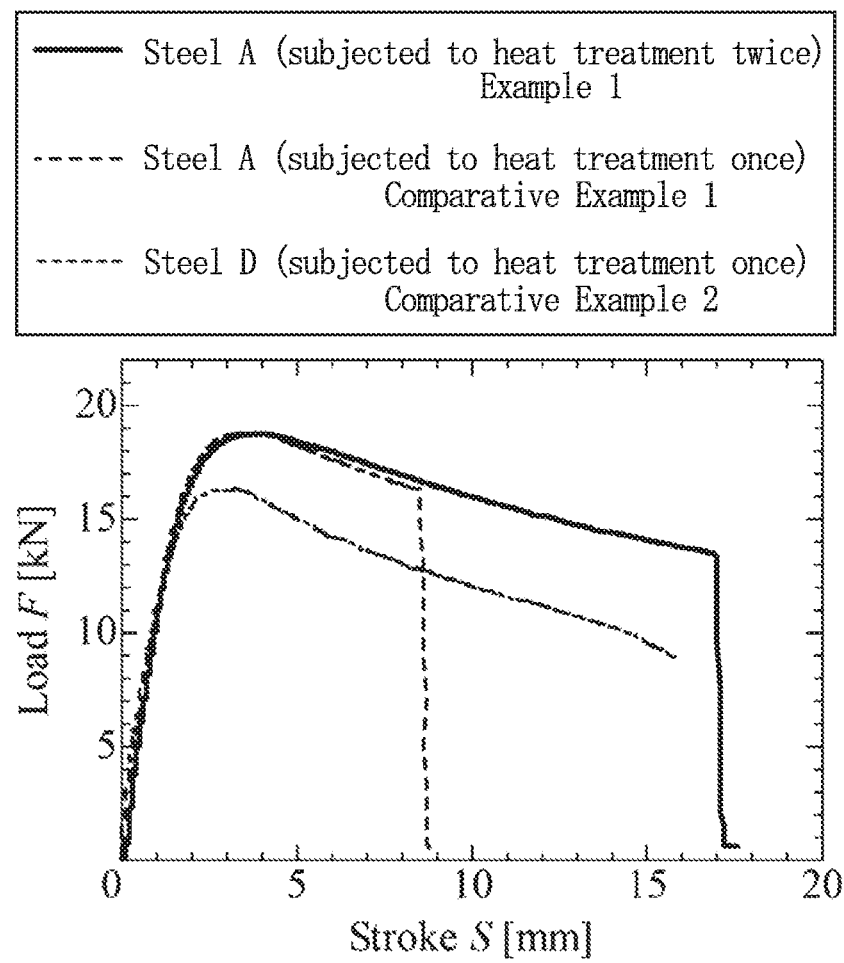
FIG. 5 is a diagram illustrating test results for Example 1.

Next, as illustrated in FIG. 4, a static load was applied to the apexes of the hat profile in the three types of the bumper cross-section profile model 50, and the resistance to deformation and stroke curve for each of the bumper cross-section profile models 50 compared. The results thereof are illustrated in FIG. 5.

For the bumper cross-section profile model 50 of Comparative Example 1, in which the same material was employed as Example 1 and a single heat treatment (a normal hot stamping process) performed, fracturing occurred at a stroke of 8.5 mm, followed by a rapid decrease in load. By contrast, for the bumper cross-section profile model 50 of Example 1, in which the gamma grain size had been made fine by performing austenite transformation heat treatment twice, followed by inducing martensite transformation in order to achieve increased toughness, fracture did not occur until the stroke has exceeded 17 mm, and a high deformation load was accordingly maintained.

It is also apparent that the deformation load of the bumper cross-section profile model 50 of Example 1 is higher than that of the Steel D with a lower carbon content (Comparative Example 2), and that plastic deformation until can also be maintained therewith as far as a high stroke similar to that of the Steel D (Comparative Example 2).

Example 2

Figure 6:
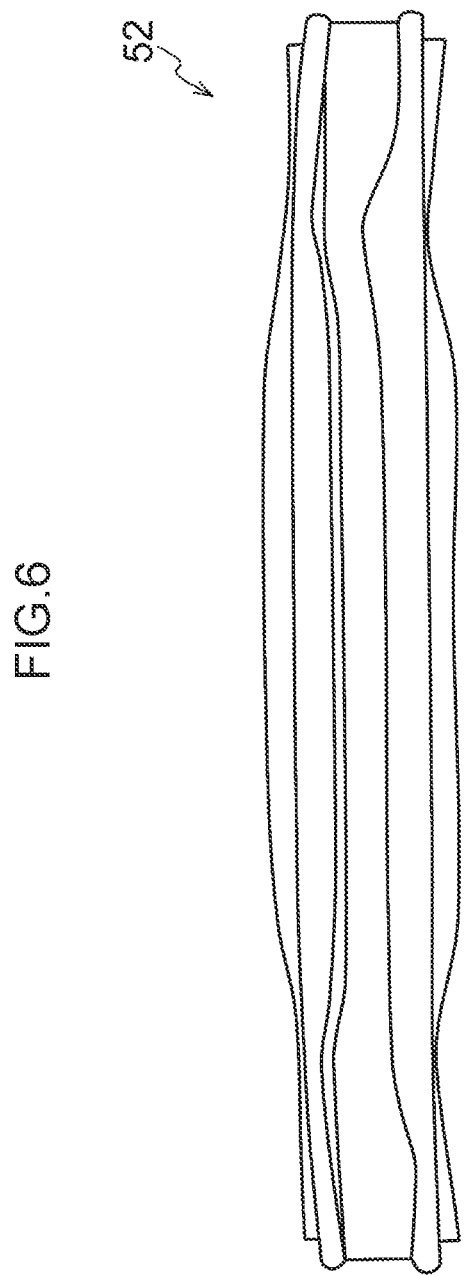
FIG. 6 is a diagram illustrating an M-shaped bumper according to Example 2.

Steel B material (hot rolled sheet steel) with a sheet thickness of 2.3 mm was employed to verify the advantageous effects of performing heat treatment using a mold twice in order to form an M-shaped bumper 52 as illustrated in FIG. 6.

In a first heat treatment process (corresponding to the first heat treatment process 20 of the exemplary embodiment), the material was loaded into a gas furnace, heated to 935° C., and held for approximately 6 minutes. The material was then removed and placed on a flat portion of a mold upper face, immediately covered from above the material by a flat plate mold, and quenched while in a flat sheet state by removing heat using the two molds.

Then the material that had been quenched in the first heat treatment was loaded into a gas furnace set to 860° C. and held for approximately 2.5 minutes. Immediately thereafter, the material was removed and loaded into a press mold and molded at a temperature higher than the Ar3 transformation point, while also being quenched by cooling rapidly (corresponding to the second heat treatment process 40 of the exemplary embodiment) so as to manufacture the M-shaped bumper 52 (Example 2).

As a comparative example, Steel B material that is the same material as that of Example 2 was loaded into a gas furnace, heated to 950° C. and held for approximately 6 minutes. The Steel B material was then loaded into a press mold and molded so as to manufacture a quenched M-shaped bumper 52 (Comparative Example 3).

Figure 7:
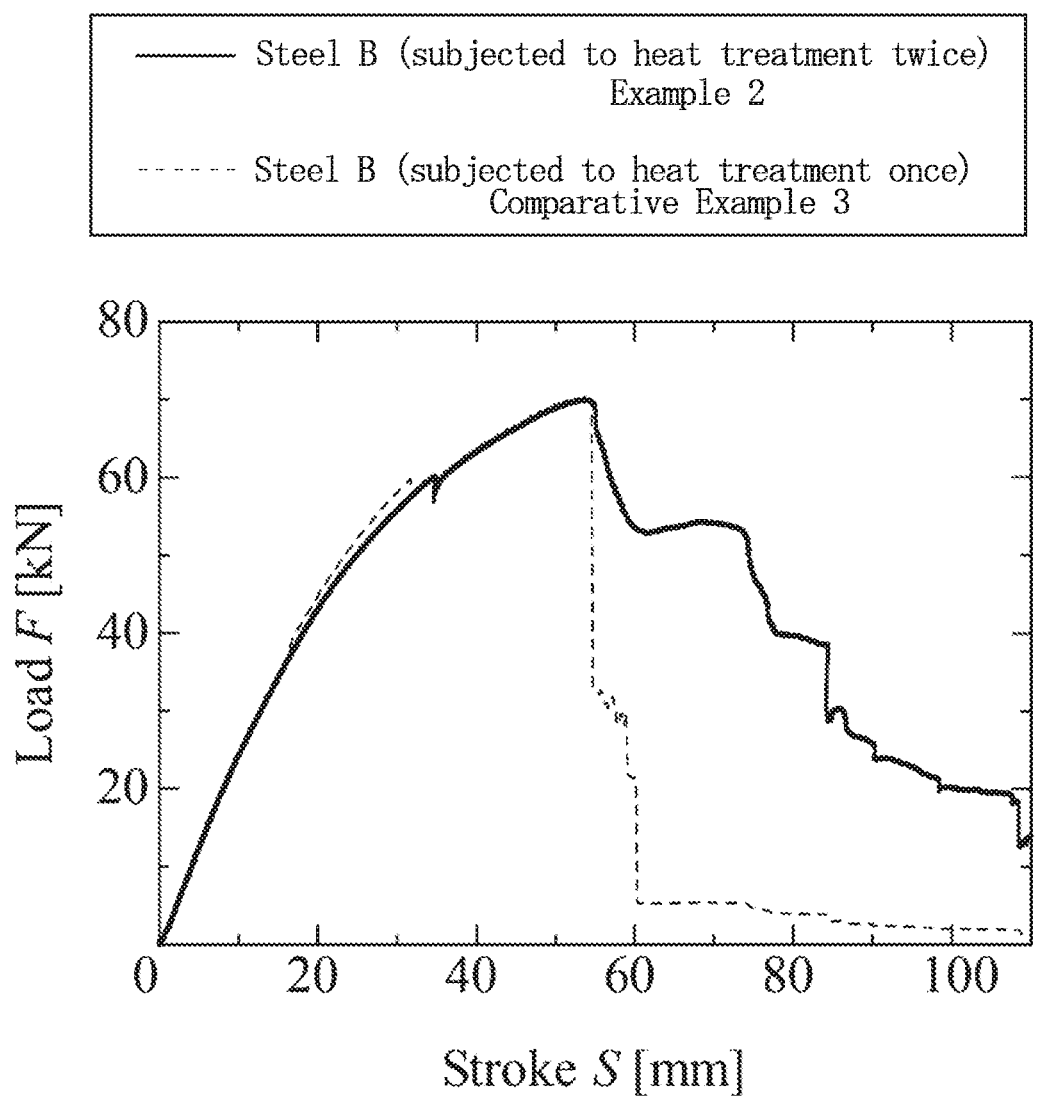
FIG. 7 is a diagram illustrating test results for Example 2.

Next, the two types of the M-shaped bumper 52 were each set in a kinetic hydraulic tester having a bending span set at 800 mm and three-point bending was performed on the M-shaped bumper 52 using an indenter having a 150 mm tip radius at a speed of 9 km/h, and the load-stroke curves thereof compared in a similar manner to in the case of Example 1. The test results thereof are illustrated in FIG. 7.

Similarly to in the case of Example 1, it is apparent that whereas there is a decrease in load for Comparative Example 3 due to fracturing at a stroke of approximately 60 mm, Example 2 that has been subjected to austenite transformation heat treatment twice does not exhibit a sudden decrease in load, but exhibits stable load characteristics without any rapid fluctuations in load.

Example 3

Figure 8:
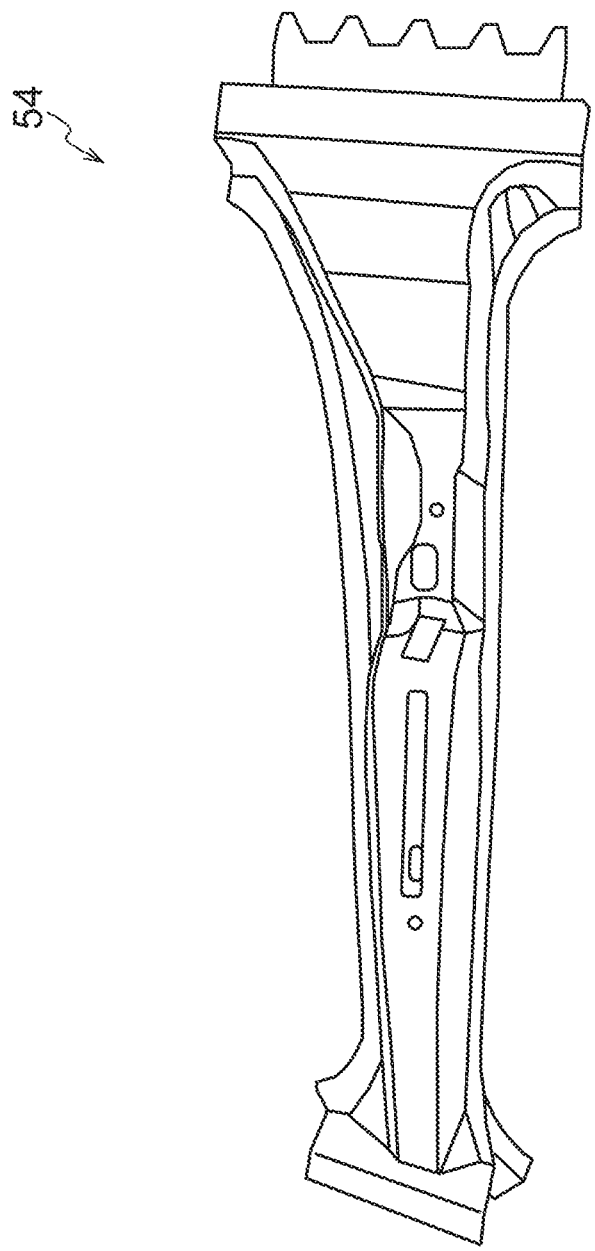
FIG. 8 is a diagram illustrating a center pillar according to Example 3.

Steel C material (cold rolled sheet steel) with a sheet thickness of 1.6 mm was employed to verify the advantageous effects of, similarly to in Example 2, performing heat treatment twice using a mold in order to mold a center pillar 54 as illustrated in FIG. 8. The material was quenched in the first heat treatment process (corresponding to the first heat treatment process 20 of the exemplary embodiment), and quenching was performed at the same time as molding through use of the second heat treatment process (corresponding to the second heat treatment process 40 of the exemplary embodiment).

In the first heat treatment process, the material was loaded into a gas furnace and heated to 950° C. where it was held for approximately 5 minutes. The material was then removed and placed on a flat portion of a mold upper face, immediately covered from above the material by a flat plate mold, and quenched while in a flat sheet state by removing heat using the two molds.

The material that had been quenched in the first heat treatment process was then loaded into a gas furnace set to 870° C. and held for approximately 2 minutes. Immediately thereafter, the material was removed and loaded into a press mold and molded at a temperature higher than the Ar3 transformation point, while also being quenched by cooling rapidly so as to manufacture the center pillar 54 (Example 3).

As a comparative example, Steel C material that is the same material as that of Example 3 was loaded into a gas furnace and heated to 950° C. and held for approximately 5 minutes. The material was then loaded into a press mold and quenched at the same time as being molded so as to manufacture the center pillar 54 (Comparative Example 4).

Next, a closing plate was produced by cutting a 1.4 mm sheet steel of 440 MPa grade cold rolled steel so as to conform to the outer profile of the center pillar 54, and the opening in the back face of the center pillar 54 was closed off using the closing plate so as to achieve a closed cross-section structure. The center pillar 54 and the closing plate were joined together using a round W electrode of φ6 with a nugget diameter of 4.5√t at a pitch of 30 mm so as to manufacture the center pillar 54. Production conditions were similar to those in both Example 3 that employs heat treatment twice, and Comparative Example 4 that employs heat treatment once.

Figure 9:
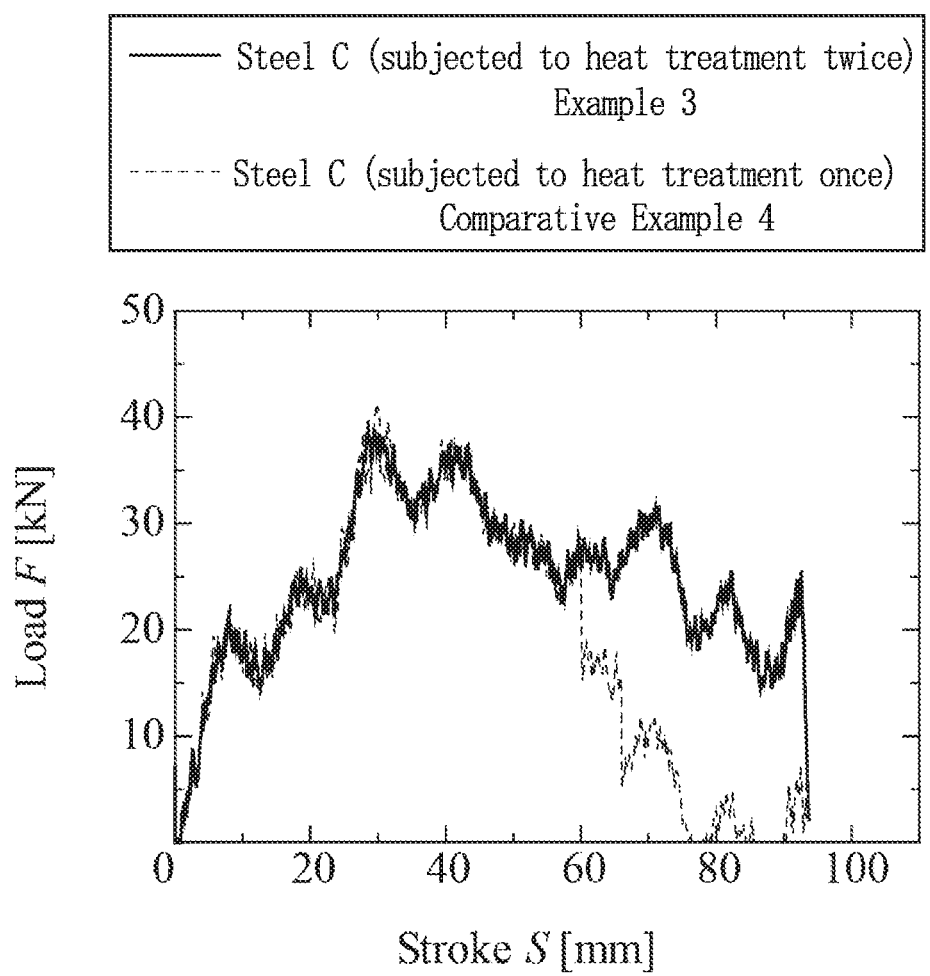
FIG. 9 is a diagram illustrating test results for Example 3.

Next, the two types of the center pillar 54 were set in a drop weight impact tester at a support interval of 600 mm, and three-point bending was performed with a φ100 mm indenter at a speed of 25 km/h. The load-stroke curves thereof were compared similarly to in the case of Example 1. The test results thereof are illustrated in FIG. 9.

Similarly to in Example 1 and Example 2, a sudden decrease in load occurred at a stroke of 60 mm for Comparative Example 4, in which heat treatment was employed once, and the base material fractured. In Example 3 however, in which austenite transformation heat treatment had been performed twice, there was no sudden decrease in load until a stroke of 90 mm was exceeded, and it is apparent that performance is superior to that of Comparative Example 4.

The manufacturing methods of each of the Examples, in which austenite transformation is performed at least twice at a temperature higher than the Ac3 transformation point and quenching is performed while molding is performed at a temperature higher than the Ar3 transformation point, have been confirmed to obtain moldings with higher toughness and superior deformation characteristics to hot stamping with austenite transformation and quenching performed a single time.

EXPLANATION OF THE REFERENCE NUMERALS

10 quenched molding manufacturing method
12 sheet steel blank (steel material)
14 quenched molding
30 hot press steel material
40 second heat treatment process
50 bumper cross-section profile model
52 M-shaped bumper
54 center pillar
Supplement The following aspects may be generalized from the present specification.

Namely, a first aspect is a method for manufacturing a quenched molding, the method including:

a first heat treatment process of heating a blanked steel material to a temperature higher than its Ac3 transformation point to perform austenite transformation, and then cooling to induce martensite transformation or bainite transformation;

a second heat treatment process of heating the steel material that has undergone the first heat treatment process to a temperature higher than the Ac3 transformation point to perform austenite transformation, and then cooling to induce martensite transformation; and after the steel material has been heated to a temperature higher than the Ac3 transformation point in at least one process from out of the first heat treatment process or the second heat treatment process, completing molding at a temperature higher than an Ar3 transformation point.

A second aspect is the quenched molding manufacturing method of the first aspect, wherein: a first heat treatment heating temperature to which the steel material is heated in the first heat treatment process is in a range from the Ac3 transformation point+50° C. to the Ac3 transformation point+150° C.; and a second heat treatment heating temperature to which the steel material is heated in the second heat treatment process is a temperature higher than the Ac3 transformation point but no higher than the Ac3 transformation point+80° C.

A third aspect is the quenched molding manufacturing method of the first aspect, wherein:

a first heat treatment heating temperature to which the steel material is heated in the first heat treatment process is in a range from the Ac3 transformation point as defined by Equation (1)+70° C. to the Ac3 transformation point+170° C.; and a second heat treatment heating temperature to which the steel material is heated in the second heat treatment process is in a range from the Ac3 transformation point as defined by Equation (1)+20° C. to the Ac3 transformation point+100° C., Equation (1):

$$Ac3(°\ C.)=910-203\times\sqrt{C}\ (mass\ \%)+44.7\times Si\ (mass\ \%)-30\times Mn\ (mass\ \%)-11\times Cr\ (mass\ \%)+700\times S\ (mass\ \%)+400\times Al\ (mass\ \%)+50\times Ti\ (mass\ \%).$$ Equation (1):

A fourth aspect is the quenched molding manufacturing method of the third aspect, wherein a rate of temperature increase in the first heat treatment process is at least 20° C./second.

A fifth aspect is the quenched molding manufacturing method of either the third aspect or the fourth aspect, wherein a rate of temperature increase in the second heat treatment process is at least 20° C./second.

A sixth aspect is the quenched molding manufacturing method of any one aspect of the second aspect to the fifth aspect, wherein a heating time from reaching the first heat treatment heating temperature in the first heat treatment process until an end of heating in the first heat treatment process is 400 seconds or shorter.

A seventh aspect is the quenched molding manufacturing method of any one aspect of the second aspect to the sixth aspect, wherein a heating time from reaching the second heat treatment heating temperature in the second heat treatment process until an end of heating in the second heat treatment process is 400 seconds or shorter.

An eighth aspect is the quenched molding manufacturing method of any one aspect of the first aspect to the seventh aspect, wherein the steel material has a carbon content of from 0.3 mass % to 0.8 mass %.

A ninth aspect is the quenched molding manufacturing method of any one aspect of the first aspect to the eighth aspect, wherein steel material processed in the first heat treatment process has a hard phase volume fraction of no greater than 90%.

A tenth aspect is the quenched molding manufacturing method of any one aspect of the first aspect to the ninth aspect, wherein a molding obtained by the second heat treatment process has a martensite structure volume fraction of at least 50%.

An eleventh aspect is the quenched molding manufacturing method of any one aspect of the first aspect to the eighth aspect, wherein the cooling of the first heat treatment process is performed with the steel material in a clamped state in a mold.

A twelfth aspect is a method for manufacturing a hot press steel material, the method including:

heating a blanked steel material to a temperature higher than its Ac3 transformation point to perform austenite transformation, and then cooling to induce martensite transformation or bainite transformation.

A thirteenth aspect is the hot press steel material manufacturing method of the twelfth aspect, wherein the steel material is heated to a temperature higher than the Ac3 transformation point, and then molded at a temperature higher than an Ar3 transformation point and cooled.

A fourteenth aspect is the hot press steel material manufacturing method of either the twelfth aspect or the thirteenth aspect, wherein the temperature to which the steel material is heated is in a range from the Ac3 transformation point+50° C. to the Ac3 transformation point+150° C.

A fifteenth aspect is the hot press steel material manufacturing method of either the twelfth aspect of the thirteenth aspect, wherein the temperature to which the steel material is heated is in a range from the Ac3 transformation point as defined by Equation (1)+70° C. to the Ac3 transformation point+170° C., $$Ac3(° C.)=910-203\times\sqrt{C} \text{ (mass \%)}+44.7\times Si \text{ (mass \%)}-30\times Mn \text{ (mass \%)}-11\times Cr \text{ (mass \%)}+700\times S \text{ (mass \%)}+400\times Al \text{ (mass \%)}+50\times Ti \text{ (mass \%)}. \quad \text{Equation (1):}$$

A sixteenth aspect is the hot press steel material manufacturing method of the fifteenth aspect, wherein a rate of temperature increase in the heating is at least 20° C./second.

A seventeenth aspect is the hot press steel material manufacturing method of any one aspect of the fourteenth aspect to the sixteenth aspect, wherein a heating time from reaching the heating temperature is 400 seconds or shorter.

An eighteenth aspect is the hot press steel material manufacturing method of any one aspect of the twelfth aspect to the seventeenth aspect, wherein the steel material has a carbon content of from 0.3 mass % to 0.8 mass %.

A nineteenth aspect is the hot press steel material manufacturing method of any one aspect of the twelfth aspect to the eighteenth aspect, wherein the steel material has a hard phase volume fraction of no greater than 90%.

A twentieth aspect is the quenched molding manufacturing method of any one aspect of the first aspect to the eighth aspect, wherein the cooling is performed with the steel material in a clamped state in a mold.

A twenty-first aspect is a hot press steel material wherein:
a carbon content is from 0.3 mass % to 0.8 mass %; and
a sum of volume fractions of martensite structure and bainite structure is at least 80%.

A twenty-second aspect is the hot press steel material of the twenty-first aspect wherein the hot press steel material configures a flat blank.

A twenty-third aspect is the hot press steel material of the twenty-first aspect wherein the hot press steel material configures a pressed molding.

A twenty-fourth aspect is a method for manufacturing a quenched molding, the method including:
heating the hot press steel material of any one aspect of the twenty-first aspect to the twenty-third aspect to a temperature higher than its Ac3 transformation point to perform austenite transformation, molding the hot press steel material at a temperature higher than its Ar3 transformation point, and then cooling to induce martensite transformation.

A twenty-fifth aspect is a method for manufacturing a quenched molding, the method including:
heating a molding having a sum of volume fractions of martensite structure and bainite structure of at least 80% to a heat treatment heating temperature higher than its Ac3 transformation point to perform austenite transformation, and then cooling to induce martensite transformation.

A twenty-sixth aspect is the quenched molding manufacturing method of the twenty-fifth aspect, wherein the molding is a quenched molding.

A twenty-seventh aspect is the quenched molding manufacturing method of either the twenty-fifth aspect or the twenty-sixth aspect, wherein the heat treatment heating temperature is a temperature higher than the Ac3 transformation point but no higher than the Ac3 transformation point+80° C.

A twenty-eighth aspect is the quenched molding manufacturing method of either the twenty-fifth aspect or the twenty-sixth aspect, wherein the heat treatment heating temperature is in a range from the Ac3 transformation point as defined by Equation (1)+20° C. to the Ac3 transformation point+100° C., $$Ac3(° C.)=910-203\times\sqrt{C} \text{ (mass \%)}+44.7\times Si \text{ (mass \%)}-30\times Mn \text{ (mass \%)}-11\times Cr \text{ (mass \%)}+700\times S \text{ (mass \%)}+400\times Al \text{ (mass \%)}+50\times Ti \text{ (mass \%)}. \quad \text{Equation (1):}$$

A twenty-ninth aspect is the quenched molding manufacturing method of the twenty-eighth aspect, wherein a rate of temperature increase when heating to the heat treatment heating temperature is at least 20° C./second.

A thirtieth aspect is the quenched molding manufacturing method of any one aspect of the twenty-fifth aspect to the twenty-ninth aspect, wherein a heating time from reaching the heat treatment heating temperature is 400 seconds or shorter.

Other Aspects

The following other aspects may be generalized from the present specification.

A first other aspect is a method for manufacturing a quenched molding, the method including:
a first heat treatment process of heating a steel material to at least its Ac3 transformation point to perform austenite transformation, and then cooling to induce martensite transformation or bainite transformation;
a second heat treatment process of heating the steel material that has undergone the first heat treatment process to at least the Ac3 transformation point to perform austenite transformation, and then cooling to induce martensite transformation; and
molding the steel material at a temperature of at least an Ar3 transformation point in at least one process out of the first heat treatment process or the second heat treatment process.

A second other aspect is the quenched molding manufacturing method of the first other aspect, wherein:
a first heat treatment heating temperature to which the steel material is heated in the first heat treatment process is in a range from the Ac3 transformation point+50° C. to the Ac3 transformation point+150° C.; and
a second heat treatment heating temperature to which the steel material is heated in the second heat treatment process is in a range from the Ac3 transformation point to the Ac3 transformation point+80° C.

A third other aspect is the quenched molding manufacturing method of the first other aspect, wherein:
a first heat treatment heating temperature to which the steel material is heated in the first heat treatment process is in a range from the Ac3 transformation point as defined by Equation (1)+70° C. to the Ac3 transformation point+170° C.; and
a second heat treatment heating temperature to which the steel material is heated in the second heat treatment process is in a range from the Ac3 transformation point as defined by Equation (1)+20° C. to the Ac3 transformation point+100° C., $$Ac3(°\text{C.})=910-203\times\sqrt{C}\text{ (mass \%)}+44.7\times Si\text{ (mass \%)}-30\times Mn\text{ (mass \%)}-11\times Cr\text{ (mass \%)}+700\times S\text{ (mass \%)}+400\times Al\text{ (mass \%)}+50\times Ti\text{ (mass \%)}. \quad \text{Equation (1):}$$

A fourth other aspect is the quenched molding manufacturing method of the third other aspect, wherein a rate of temperature increase in the first heat treatment process is at least 20° C./second.

A fifth other aspect is the quenched molding manufacturing method of either the third other aspect or the fourth other aspect, wherein a rate of temperature increase in the second heat treatment process is at least 20° C./second.

A sixth other aspect is the quenched molding manufacturing method of any one aspect of the second other aspect to the fifth other aspect, wherein a heating time from reaching the first heat treatment heating temperature in the first heat treatment process until an end of heating in the first heat treatment process is 400 seconds or shorter.

A seventh other aspect is the quenched molding manufacturing method of any one aspect of the second other aspect to the sixth other aspect, wherein a heating time from reaching the second heat treatment heating temperature in the second heat treatment process until an end of heating in the second heat treatment process is 400 seconds or shorter.

An eighth other aspect is the quenched molding manufacturing method of any one aspect of the first other aspect to the seventh other aspect, wherein the steel material has a carbon content of from 0.3 mass % to 0.8 mass %.

A ninth other aspect side a method for manufacturing a hot press steel material, the method including:
heating a steel material to at least its Ac3 transformation point to perform austenite transformation, and then cooling to induce martensite transformation or bainite transformation.

A tenth other aspect is the hot press steel material manufacturing method of the ninth other aspect, wherein the steel material is heated to at least the Ac3 transformation point, and then molded at a temperature of at least an Ar3 transformation point and cooled.

An eleventh other aspect is the hot press steel material manufacturing method of either the ninth other aspect or the tenth other aspect, wherein the temperature to which the steel material is heated is in a range from the Ac3 transformation point+50° C. to the Ac3 transformation point+150° C.

A twelfth other aspect is the hot press steel material manufacturing method of either the ninth other aspect or the tenth other aspect, wherein the temperature to which the steel material is heated is in a range from the Ac3 transformation point as defined by Equation (1)+70° C. to the Ac3 transformation point+170° C., $$Ac3(°\text{C.})=910-203\times\sqrt{C}\text{ (mass \%)}+44.7\times Si\text{ (mass \%)}-30\times Mn\text{ (mass \%)}-11\times Cr\text{ (mass \%)}+700\times S\text{ (mass \%)}+400\times Al\text{ (mass \%)}+50\times Ti\text{ (mass \%)}. \quad \text{Equation (1):}$$

A thirteenth other aspect is the hot press steel material manufacturing method of the twelfth other aspect, wherein a rate of temperature increase in the heating is at least 20° C./second.

A fourteenth other aspect is the hot press steel material manufacturing method of any one aspect of the eleventh other aspect to the thirteenth other aspect, wherein a heating time from reaching the heating temperature is 400 seconds or shorter.

A fifteenth other aspect is the hot press steel material manufacturing method of any one aspect of the ninth other aspect to the fourteenth other aspect, wherein the steel material has a carbon content of from 0.3 mass % to 0.8 mass %.

A sixteenth other aspect is a hot press steel material wherein:
a carbon content is from 0.3 mass % to 0.8 mass %; and
a sum of volume fractions of martensite structure and bainite structure is at least 80%.

A seventeenth other aspect is a method for manufacturing a quenched molding, the method including:
heating the hot press steel material of the sixteenth other aspect to at least its Ac3 transformation point to perform austenite transformation, molding the hot press steel material at a temperature of at least its Ar3 transformation point, and then cooling to induce martensite transformation.

An eighteenth other aspect is a method for manufacturing a quenched molding, the method including:
heating a molding having a sum of volume fractions of martensite structure and bainite structure of at least 80% to a heat treatment heating temperature of at least its Ac3 transformation point to perform austenite transformation, and then cooling to induce martensite transformation.

A nineteenth other aspect is the quenched molding manufacturing method of the eighteenth other aspect, wherein the molding is a quenched molding.

A twentieth other aspect is the quenched molding manufacturing method of either the eighteenth other aspect or the nineteenth other aspect, wherein the heat treatment heating temperature is a temperature in a range from the Ac3 transformation point to the Ac3 transformation point+80° C.

A twenty-first other aspect is the quenched molding manufacturing method of either the eighteenth other aspect or the nineteenth other aspect, wherein the heat treatment heating temperature is in a range from the Ac3 transformation point as defined by Equation (1)+20° C. to the Ac3 transformation point+100° C., $$Ac3(°\text{C.})=910-203\times\sqrt{C}\text{ (mass \%)}+44.7\times Si\text{ (mass \%)}-30\times Mn\text{ (mass \%)}-11\times Cr\text{ (mass \%)}+700\times S\text{ (mass \%)}+400\times Al\text{ (mass \%)}+50\times Ti\text{ (mass \%)}. \quad \text{Equation (1):}$$

A twenty-second other aspect is the quenched molding manufacturing method of the twenty-first other aspect, wherein a rate of temperature increase when heating to the heat treatment heating temperature is at least 20° C./second.

A twenty-third other aspect is the quenched molding manufacturing method of any one aspect of the eighteenth other aspect to the twenty-second other aspect, wherein a heating time from reaching the heat treatment heating temperature is 400 seconds or shorter.

The disclosure of Japanese Patent Application No. 2016-229472, filed on Nov. 25, 2016, is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A method for manufacturing a quenched molding, the method comprising:
a first processing comprising heating a blanked steel material to a first heat treatment temperature, the first heat treatment temperature being in a range of from an Ac3 transformation point+70° C. to the Ac3 transformation point+170° C., to perform austenite transformation, wherein the Ac3 transformation point is a temperature defined by Equation (1), and then cooling to induce martensite transformation or bainite transformation, wherein the blanked steel material has a chemical composition comprising, in mass %, C: from 0.3% to 0.8%, Si: from 0.001% to 2.0%, Mn: from 0.5% to 3.0%, P: not greater than 0.05%, S: not greater than 0.01%, sol. Al: from 0.001% to 1.0%, N: not greater than 0.01%, and B: not greater than 0.01%, and a remainder comprising Fe and impurities;

a second processing comprising heating the steel material that has undergone the first processing to a second heat treatment temperature, the second heat treatment temperature being in a range of from the Ac3 transformation point+20° C. to the Ac3 transformation point+100° C., to perform austenite transformation, and then cooling to induce martensite transformation, wherein a heating time from reaching said second heat treatment temperature until an end of heating in said second processing is 400 seconds or shorter; and after the steel material has been heated to a temperature higher than the Ac3 transformation point in at least one of the first processing or the second processing, completing molding at a temperature higher than a Ar3 transformation point, wherein:

Equation (1):

$$Ac3(° C.)=910-203×\sqrt{C} \text{ (mass \%)}+44.7×Si \text{ (mass \%)}-30×Mn \text{ (mass \%)}-11×Cr \text{ (mass \%)}+700×S \text{ (mass \%)}+400×Al \text{ (mass \%)}+50×Ti \text{ (mass \%)}$$

a rate of temperature increase in the first processing, defined as a rate of temperature increase until reaching the first heat treatment temperature, is at least 20° C./second; and a rate of temperature increase in the second processing, defined as a rate of temperature increase until reaching the second heat treatment temperature, is at least 20° C./second.

2. The method for manufacturing a quenched molding of claim 1, wherein a heating time from reaching the first heat treatment temperature in the first processing until an end of heating in the first processing is 400 seconds or shorter.

3. The method for manufacturing a quenched molding of claim 1, wherein steel material processed in the first processing has a volume fraction of a martensite phase and a bainite phase of no greater than 90%.

4. The method for manufacturing a quenched molding of claim 1, wherein a molding obtained after the second heating and cooling has a martensite structure volume fraction of at least 50%.

5. The method for manufacturing a quenched molding of claim 1, wherein the cooling of the first processing is performed with the steel material in a clamped state in a mold.

6. The method for manufacturing a quenched molding of claim 1, wherein the cooling of the second processing step is performed with the steel material in a clamped state in a mold.

* * * * *